United States Patent [19]
Lloyd et al.

[11] 3,914,630
[45] Oct. 21, 1975

[54] HEAT REMOVAL APPARATUS FOR DYNAMOELECTRIC MACHINES

[75] Inventors: Wayne B. Lloyd, Baltimore; Dale R. Logan, Arnold, both of Md.; Yu-Sun Tang, Bethel Park, Pa.

[73] Assignee: Westinghouse Electric Corporation, Pittsburgh, Pa.

[22] Filed: Oct. 23, 1973

[21] Appl. No.: 408,974

[52] U.S. Cl. .................... 310/61; 310/62; 310/64; 165/86; 165/85; 165/105
[51] Int. Cl. .......................................... H02k 1/32
[58] Field of Search .......... 310/52, 53, 112, 54, 55, 310/114, 56, 57, 58, 59, 60, 61, 62, 63, 64, 65; 165/86, 105, 85

[56] References Cited
UNITED STATES PATENTS

| | | | |
|---|---|---|---|
| 2,330,121 | 9/1943 | Heintz | 310/52 |
| 3,078,805 | 2/1963 | Pezzillo | 310/62 |
| 3,135,211 | 6/1964 | Pezzillo | 310/54 |
| 3,150,277 | 9/1964 | Chubb | 310/64 |
| 3,318,253 | 5/1967 | Campolong | 310/64 |
| 3,441,757 | 4/1969 | Erickson | 310/62 |
| 3,517,730 | 6/1970 | Wyatt | 165/105 |
| 3,610,975 | 10/1971 | Onjanow | 310/63 |
| 3,700,551 | 10/1972 | Germer | 165/105 |
| 3,765,480 | 10/1973 | Fries | 165/86 |

*Primary Examiner*—R. Skudy
*Attorney, Agent, or Firm*—F. J. Baehr, Jr.

[57] ABSTRACT

A dynamoelectric machine has a hollow shaft for transferring heat from within a rotor of the machine to a finned heat remover. The finned heat remover is rotated by separate power, in close relationship with respect to the shaft. A lubricant in a porous bushing maintains a heat transfer relationship between the rotating finned heat remover and the shaft. A fluid within the hollow shaft evaporates at the hot end of the shaft which is radially inwardly of the rotor. The evaporated fluid then passes through the hollow portion of the shaft to its cooler end where it condenses, giving off heat to the finned heat remover. The condensed liquid then returns to the hot end and repeats the evaporative condensing cycle.

8 Claims, 3 Drawing Figures

HEAT REMOVAL APPARATUS FOR DYNAMOELECTRIC MACHINES

BACKGROUND OF THE INVENTION

1. Field of the Invention

This invention relates to dynamoelectric machines, such as motors and generators, and more particularly to heat removal shafts and rotatable fins for cooling electric motors.

2. Description of the Prior Art

Electric motors, particularly alternating current servomotors, are often severely limited in continuous torque rating due to the inability of the motors to remove heat from the rotors. The rotors are of small dimensions specifically to minimize the mass moment of inertia which, if not minimized, would reduce the fast response time of the motor. The minimization of the rotor results in a high power density, often in excess of 200 watts/in.$^3$, and it results in heating of the rotor when utilized with high input conditions. This causes damage to the rotor bearings and it causes a sharp drop in output torque due to the increased resistance of the squirrel cage conductors. Eventually the rotor itself begins to deteriorate.

More conventional approaches to improving heat transfer from the rotor have been confined to air gap reduction or emissive coatings. Another more recent approach to the problem of cooling motors involves the use of a hollow shaft as a medium of heat transfer wherein an evaporative fluid is contained therein. The fluid evaporates at the hot end, it passes to the cool end of the shaft inside the shaft, and condenses. The condensate returns to the hot end of the shaft and the cycle of evaporation and condensing is repeated. In addition to this method of cooling hot parts of motors some form of fins are occasionally fixedly attached to the cool end of the shaft to dissipate the heat transferred thereto.

Control motors, used for servomotors require cooling at a wide range of rpms. The prior art does not accomplish the cooling at slow speeds satisfactorily due to the low heat dissipation of slow turning heat removing blades or fins.

SUMMARY OF THE INVENTION

The present invention provides a simple yet effective structure for cooling the hot rotor portion of an electric motor while not burdening the motor with a high mass moment attached thereto for dissipating heat.

An elongated hollow shaft rotatably supports the rotor within the motor. The hollow shaft has a fluid within it that evaporates when heated by the heat within the rotor. The heated vapor travels from the end supporting the rotor through the central portion of the elongated hollow shaft to the opposite end of the shaft. This latter end is cooler, as it has a finned heat remover in a rotatable heat transfer relationship with respect to the hollow shaft. The heat of the vapor passes through the shaft walls and into the rotating heat remover. The hot vapor thusly cools and condenses, moving into a stainless steel wick-like portion disposed against the inner walls of the hollow shaft. The condensed vapor, now a liquid, travels through the wick back to the hot portion of the shaft to repeat the cycle.

The finned heat remover is a rotor like device, coaxial with the shaft. It is in close heat transferable relationship with the shaft. A generally cylindrical, porous, oil filled metal member is disposed between the shaft and the finned heat remover. The oil provides a heat transfer agent between the shaft and the finned heat remover. The finned heat remover is also provided with rotational movement by a separate electric motor. This arrangement places no burden on the cooled electric motor itself, and the motor is cooled even at periods of zero or low rpms when cooling is most essential.

An object of the invention is to provide improvement in the continuous duty rating of electric motors, especially as pertaining to torque ratings at stall or slow speeds.

Another object of the invention is to provide an electric motor for servo applications that is suitable for operation at all positional attitudes as well as under various vibrational and g loadings, including a zero g loading.

Still yet another object of the invention is to provide an electric motor having improved life and reliability due to less thermal stresses in the motor bearings, insulation and in the rotor itself.

BRIEF DESCRIPTION OF THE DRAWINGS

The invention, along with further objects and advantages thereof will be best understood from the following detailed description taken in connection with the accompanying drawings, in which.

DESCRIPTION OF THE PREFERRED EMBODIMENTS

Figure 1:
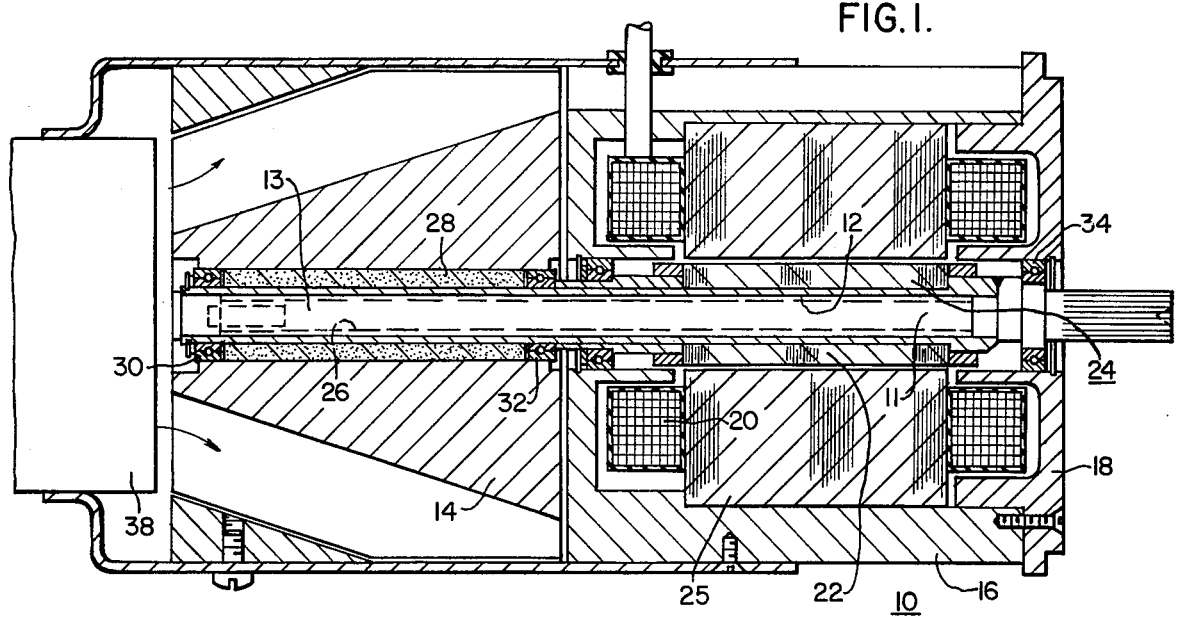
FIG. 1 is a longitudinal sectional view of a servomotor constructed in accordance with the principles of this invention.

Referring to the drawings in detail, and particularly to FIG. 1, in which an alternating current servomotor 10 is shown having an extended hollow heat pipe rotor shaft 12, and a finned heat remover 14. The heat pipe 12 has an evaporator end 11 and a condenser end 13.

The motor 10 includes a stator hourising 16, an end plate 18, windings 20, and laminations 22 which comprise a rotor 24, which is disposed within a stator 25, and is manufactured according to conventional practice.

Figure 2:
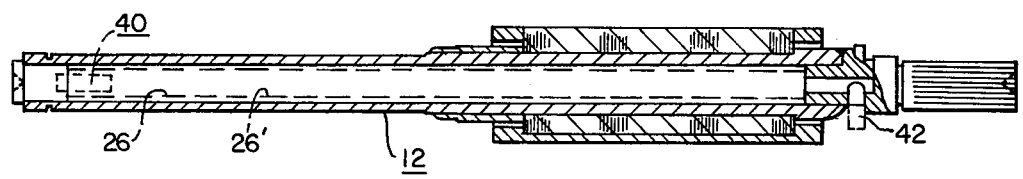
FIG. 2 is a longitudinal sectional view of a hollow rotor shaft and a portion of a rotor assembly embodying this invention.

The rotor 24 is disposed about the evaporative end 11 of the extended hollow heat pipe rotor shaft 12. Heat is transmitted from the rotor 24, through the walls of the pipe 12. The heat pipe 12 is comprised of a low coefficient of expansion metal, preferably invar, the trade name of a commercially available iron-nickel alloy. A stainless steel heat pipe wick 26, is disposed about the inner walls of the pipe 12, as shown in FIG. 2. The wick 26 is saturated with a liquid of desirable vapor pressure, usually sodium or water. The liquid vaporizes in the evaporator end 11 of the pipe 12. The liquid vapor then passes through the center of the pipe 12 to the cooler condenser end 13 disposed within the finned heat remover 14, as shown in FIG. 1. The vapor condenses, and becomes liquefied, giving off heat through the walls of the pipe 12. The liquid, sodium or water, returns through the wick 26 to the evaporator end 11 by capillary forces in the wick 26.

A porous metal bushing 28, filled with an oil and air mixture, is disposed about the condenser end 13 of the heat pipe 12. The bushing 28 is in close heat transfer relationship with the pipe 12. The oil in the bushing 28 provides better heat transfer characteristics than would a vacuum or an air gap, because the heat flows directly across the oil at a higher rate than it would through air of similar dimensions. The bushing 28 may have a close fit around the pipe 12 because invar, will not expand appreciably when heated. The bushing 28 may rest upon the pipe 12 itself. The pipe 12 is supported by suitable bearings 30, 32, and 34, only three of which are shown. The bearings 30, 32, and 34 may be thrust bearings. The porous metal bushing 28 could be a radially supportive element for the pipe 12 wherein the bushing 28 could be supported on its own bearings. This would provide at least a line of contact between the pipe 12 and the bushing 28. The oil would then be swept around the perimeter of the pipe 12.

Figure 3:
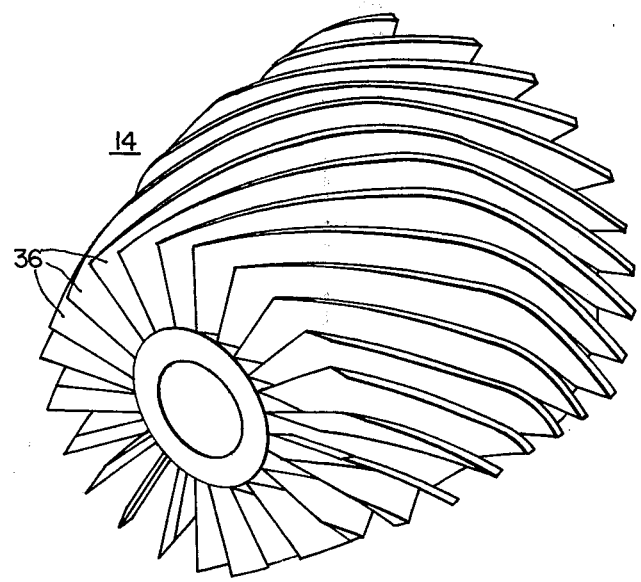
FIG. 3 is a perspective view of a finned heat remover used in this invention.

The bushing 28 is attached to the core of the finned heat remover 14. The finned heat remover 14 is preferably comprised of aluminum. The heat remover 14 has fins 36, as shown in FIG. 3, that have a helical orientation to them.

The finned heat remover 14 rotates continuously, even when the alternating current servomotor 10 is running at a low speed or even at a zero speed. The heat remover 14 is rotated by a separate electric motor, not shown. The largest amount of heat removed from the rotor 24 may occur when the rotor 24 is at zero speed, or at least when the rotor 24 is rotating at a low rpm, when the need for heat removal would be critical.

The finned heat remover 14 not being integral with the shaft 12 or in tight rotative contact with it, permits the elimination of starting friction of the rotor 24 with respect to the heat remover 14. Starting friction is replaced by a bias torque of friction which has no effect on the servo loop resolution. A slight torque jump occurs when the rotor speed equals the finned heat remover speed, but this imposes only a minimal deleterious effect on servomotor 10 performance. The heat remover mass moment of inertia is not felt by the servomotor rotor 24, except as coupled by friction and viscous drag. These coupling effects are very small, approaching negligibility.

A fan 38, shown in FIG. 1, may be disposed adjacent the finned heat remover 14. The fan 38 forces cooling air over the fins 36 of the rotating heat remover 14.

The heat pipe 12, shown in FIG. 2, upon closer examination, is comprised of a hollow iron-nickel alloy shaft. The wick 26 is comprised of a fine mesh 26' of stainless steel screen that is spirally wound to a five layer depth. The mesh 26' is compacted and embedded into the inner walls of hollow heat pipe 12 by a hydraulic process using a copper mandrel which is expanded by 30,000 psi fluid pressure in its hollow center. The embedded copper is then completely eaten away by acid, leaving a properly compacted and embedded wick 26.

The condenser end 13 of the heat pipe 12 has a palladium getter tube 40 disposed therein. The palladium getter tube 40 provides a diffusion trap for non-condensible gas molecules, especially hydrogen. The hydrogen may otherwise collect in the condenser end 13 of the heat pipe 12 and set up a barrier to the free flow of working fluid in that area. Hydrogen gas, by virtue of its partial pressure, diffuses into the getter tube 40 which comprises an evacuated chamber therein. Thus, the hydrogen is removed from the vapor flow path, which greatly extends the useful life of the heat pipe 12, and makes mechanical venting provisions unnecessary.

A generally radially directed pinch tube 42 is provided near the evaporative end 11 of the pipe 12. The pinch tube 42 is used to evacuate the hollow pipe 12, and to backfill the pipe 12 with working fluid. The working fluid may comprise sodium or water.

An alternative embodiment of the servomotor 10 arrangement includes having the shaft 12 in a vertical orientation. The condenser end 13 of the shaft 12 being immersed in a liquid coolant, not shown. Alternatively again, a coolant jacket, also not shown, may be disposed around the condenser portion 13, and rotary seals would provide insulation from the ambient air.

An additional embodiment includes utilizing the extended heat pipe 12 alone without a heat remover or fins, or in the alternative, a finned heat remover 14 may be attached directly to the heat shaft 12.

Though the invention has been described with a certain degree of particularity, changes may be made therein without departing from the spirit and the scope thereof.

We claim:

1. Apparatus for removing heat from a dynamoelectric machine comprising a housing, a stator and a rotor; said appparatus for removing heat comprising an elongated heat conductable hollow shaft having a wick therein, said shaft having an evaporator end and a condenser end, said rotor being fixedly attached to said evaporator end of said shaft, a finned heat remover rotatably disposed about the condenser end of said shaft, said rotor conducting heat to said fixedly attached hollow shaft, said hollow shaft having a fluid therein that condenses at the finned heat remover end, said condensed fluid passing through said wick member in said hollow shaft to the evaporative end where said fluid evaporates within said shaft, said fluid receiving heat from said rotor and passing as a gas through the center of said shaft to the condenser end to renew the condensation evaporation cycle, said finned heat remover rotating about said hollow shaft in a heat transfer relationship, said finned heat remover being rotated by a power source separate from the dynamoelectric machine.

2. Apparatus for removing heat from a dynamoelectric machine as recited in claim 1, wherein said heat transfer relationship between said rotating finned heat remover and said hollow shaft includes a liquid lubricant interface therebetween, said lubricant being disposed in a porous bushing, said finned heat remover rotating with respect to said hollow shaft to force additional cooling air over said machine.

3. Apparatus for removing heat from a dynamoelectric machine as recited in claim 1, wherein said dynamoelectric machine comprises an electric motor.

4. Apparatus for removing heat from a dynamoelectric machine as recited in claim 1, wherein said finned heat remover includes helical disposed fins.

5. Apparatus for removing heat from a dynamoelectric machine as recited in claim 1, wherein said fluid in said hollow shaft comprises sodium.

6. Apparatus for removing heat from a dynamoelectric machine as recited in claim 1, wherein said wick comprises an inner meshed spiral screen of stainless steel disposed about the inner walls of said hollow shaft.

7. Apparatus for removing heat from a dynamoelectric machine as recited in claim 1, wherein said hollow shaft has a palladium getter tube disposed in the condenser end of said hollow shaft.

8. Apparatus for removing heat from a dynamoelectric machine as recited in claim 2, wherein said fluid in said hollow shaft comprises water.

* * * * *